(12) United States Patent
Kang et al.

(10) Patent No.: US 8,490,530 B2
(45) Date of Patent: Jul. 23, 2013

(54) PLASTIC COMPOSITE SPRING FOR VEHICLE SUSPENSION AND APPARATUS AND METHOD FOR MANUFACTURING THE SAME

(75) Inventors: Hyun Min Kang, Gyeonggi-do (KR); Do Suck Han, Gyeonggi-do (KR); Woo Min Kyoung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/367,518

(22) Filed: Feb. 7, 2012

(65) Prior Publication Data

US 2013/0125740 A1  May 23, 2013

(30) Foreign Application Priority Data

Nov. 23, 2011 (KR) .................. 10-2011-0122702

(51) Int. Cl.
*D04C 3/00* (2006.01)
(52) U.S. Cl.
USPC ...................... 87/23; 87/34; 87/62
(58) Field of Classification Search
USPC ............... 87/23, 34, 62; 138/123, 124, 125, 138/137, 140, 145, 153, 173; 267/81, 195, 267/259
See application file for complete search history.

(56) References Cited

U.S. PATENT DOCUMENTS

| | | | | |
|---|---|---|---|---|
| 1,002,644 A | * | 9/1911 | Cobb | 87/1 |
| 1,224,878 A | * | 5/1917 | Fisher | 87/1 |
| 2,963,749 A | * | 12/1960 | Pavlic | 156/144 |
| 3,287,194 A | * | 11/1966 | Waddell, Jr. | 156/144 |
| 3,917,499 A | * | 11/1975 | Holden et al. | 156/144 |
| 4,515,737 A | | 5/1985 | Karino et al. | |
| 7,093,527 B2 | * | 8/2006 | Rapaport et al. | 87/34 |

FOREIGN PATENT DOCUMENTS

| | | |
|---|---|---|
| JP | 10047400 A | 2/1998 |
| JP | 10325433 A | 12/1998 |
| JP | 11151750 A | 6/1999 |
| JP | 2003300256 A | 10/2003 |
| KR | 10-2003-0010091 A | 2/2003 |

\* cited by examiner

*Primary Examiner* — Shaun R Hurley
(74) *Attorney, Agent, or Firm* — Edwards Wildman Palmer LLP; Peter F. Corless

(57) ABSTRACT

Disclosed is a corrugated plastic composite spring for a vehicle suspension and an apparatus and method for manufacturing the same. The apparatus includes a corrugated extrusion part, a braiding part, and a pultrusion part. The corrugated extrusion part forms a preform having a hollow corrugated structure. The braiding part weaves a three-dimensional woven fabric on the preform. The pultrusion part impregnates the three-dimensional woven fabric with thermosetting resin.

12 Claims, 2 Drawing Sheets

PLASTIC COMPOSITE SPRING FOR VEHICLE SUSPENSION AND APPARATUS AND METHOD FOR MANUFACTURING THE SAME

CROSS-REFERENCE TO RELATED APPLICATION

This application claims under 35 U.S.C. §119(a) the benefit of Korean Patent Application No. 10-2011-0122702 filed on Nov. 23, 2011, the entire contents of which are incorporated herein by reference.

BACKGROUND (a) Technical Field

The present invention relates to a corrugated plastic composite spring for a vehicle suspension. More particularly, it relates to a plastic composite spring for a vehicle suspension and an apparatus and method for manufacturing the corrugated plastic composite spring, which can substitute for a typical metal coil-type spring.

(b) Background Art

Generally, a vehicle's body is supported by a suspension connected to tires. The suspension absorbs vibration and shock generated during driving of a vehicle to provide a comfortable ride feeling, and serves to control overall balance of the vehicle body in accordance with the conditions of the road surface. Also, the suspension enables stable handling of a driver against a centrifugal force generated during turning of a vehicle, and prevents a vehicle from tilting in one direction due to the centrifugal force.

Suspensions are classified into leaf springs with stacked steel plates and coil springs with a helical steel wire. The leaf springs and coil springs are typically formed of metal materials. Recently, in order to overcome reduction of chipping resistance due to corrosion and achieve reduction of vehicle weight, many studies have been conducted to substitute metal materials with plastic composites.

Since leaf springs have a relatively simple planar structure, leaf springs have already been substituted with plastic composites. However, in the case of the coil springs, when metal materials are simply substituted with plastic composites, it is difficult to implement a spring constant which is high enough to be applied to vehicle suspensions due to a stiffness difference between a metal and a plastic composite.

Although the spring constant can be somewhat implemented by increasing the wire diameter and width and using a high-stiffness material while maintaining the helical shape, increases in the weight and material cost are hindering the mass-production of coil springs using high-stiffness materials so far.

Accordingly, in order to substitute for metal coil-type springs using high-stiffness materials, studies on various plastic composite springs having coiled, waved, and corrugated shapes have resulted. Among them, plastic composite springs having corrugated shapes are most advantageous for implementation of a desired spring constants due to their closed-sectional structures.

A technology related to a corrugated plastic composite spring is disclosed in U.S. Pat. No. 4,235,427. However, since it has to be manufactured into a closed sectional structure using high-stiffness material to implement a spring constant high enough to be applied to a vehicle suspension, the formation process is difficult, and the productivity is low, making its mass-production difficult. Also, since the technology includes a hand lay-up process and a filament winding process that are high-priced processes, there are limitations in substituting for a typical metal coil-type spring.

Although a method for manufacturing a corrugated plastic composite spring has been proposed using a typical blow molding process, materials used for production of the corrugated plastic composite spring are limited to plastic composites containing at least a certain amount of strength-reinforcing material, or pure thermoplastic resin. It is difficult to implement a spring constant and durability enough to be applied to a vehicle.

Also, in the typical manufacturing methods described above, since corrugated plastic composite springs can be manufactured by only using a single material, it is difficult to secure enough isolation performance against vibration and noise. This leads to reduction of Noise, Vibration, and Harshness (NVH) characteristics.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for manufacturing a corrugated plastic composite spring for a vehicle suspension, which can easily secure NVH characteristics by manufacturing the corrugated plastic composite spring using different materials, and can increase the productivity and enable mass-production through continuous formation in which three-step processes are linked.

The present invention also provides a corrugated plastic composite spring, which can simplify a suspension module by omitting components such as a dust cover and upper and lower spring pads of a typical metal coil-type spring, facilitate the reduction of the fabrication process and cost for components, and contribute to the reduction of the vehicle weight.

In one aspect, the present invention provides an apparatus for manufacturing a corrugated plastic composite spring for a vehicle suspension. This apparatus includes: a corrugated extrusion part forming a pre-form having a hollow corrugated structure; a braiding part weaving a three-dimensional woven fabric on the pre-form; and a pultrusion part impregnating the three-dimensional woven fabric with thermosetting resin.

In another aspect, the present invention provides a method for manufacturing a corrugated plastic composite spring for a vehicle suspension. This method includes forming a thermoplastic polymer material into a pre-form having a corrugated structure using a rotatable molding block of an extruder; forming a three-dimensional woven fabric on an outer circumferential surface of the pre-form using a plurality of yarns; and impregnating the three-dimensional woven fabric with thermosetting resin and then hardening the three-dimensional woven fabric.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
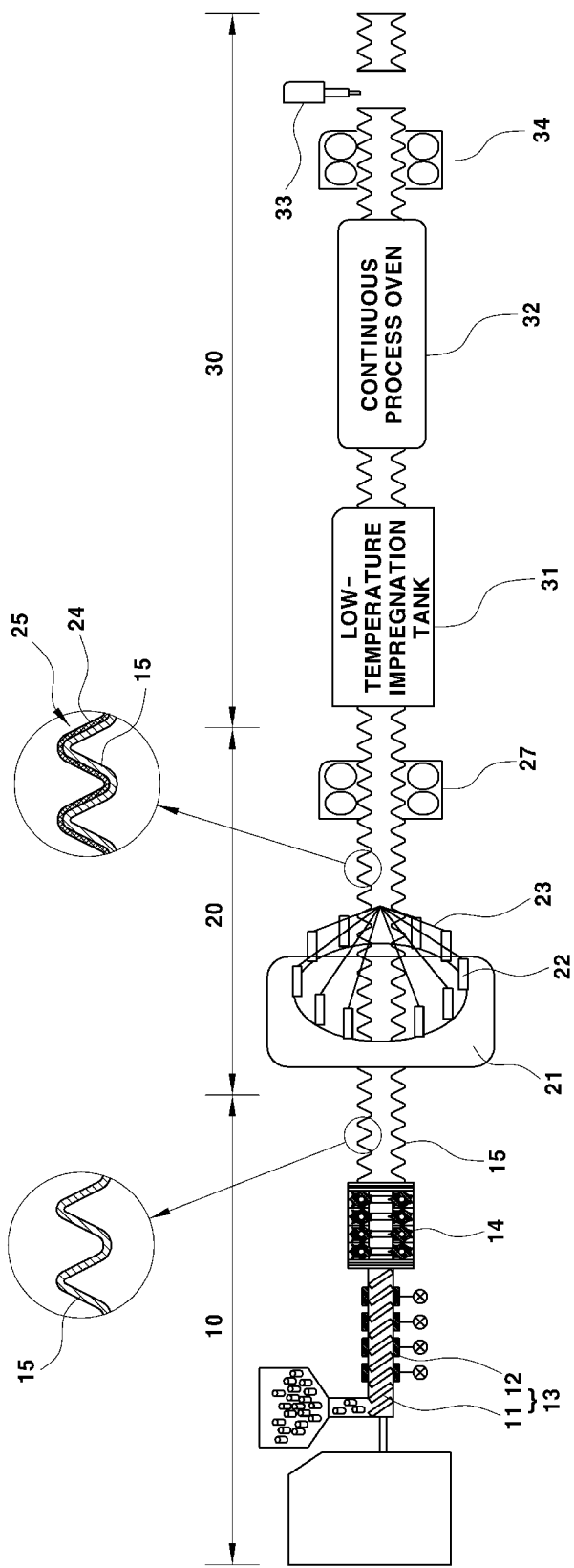
FIG. 1 is a diagram illustrating an apparatus and method for manufacturing a corrugated plastic composite spring for a vehicle suspension according to an exemplary embodiment of the present invention.

Reference numerals set forth in the Drawings includes reference to the following elements as further discussed below:

10: corrugated extrusion part
11: screw
12: cooler
13: extruder
14: rotatable molding block
15: preform
20: braiding part
21: table
22: carrier
23: yarn
24: three-dimension fabric
25: intermediate product
27: first puller
30: pultrusion part
31: low-temperature impregnation tank
32: continuous process oven It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

The reduction of the durability of a spring for a suspension and reduction of the weight thereof can be achieved by substituting a typical metal coil-type spring with a corrugated plastic composite spring to solve corrosion related issues. Also, the inner layer and the outer layer of the corrugated plastic composite spring may be formed of different materials to increase the isolation against vibration and noise.

As shown in FIG. 1, an apparatus for continuously forming a corrugated plastic composite spring for a suspension system, e.g., a composite spring having a hollow corrugated structure, using different materials may include a corrugated extrusion part 10, a braiding part 20, and a pultrusion part 30. The corrugated extrusion part 10 may form a preform of a hollow corrugated structure. In the braiding part 20, a three-dimensional woven fabric may be woven on the preform using a continuous fiber without a separate heat treatment. In the pultrusion part 30, thermosetting resin may be impregnated and hardened.

The corrugated extrusion part 10 may be equipped with a screw 11 for transferring and stirring thermoplastic polymer materials. An extruder 13 may include a cooler 12 on the outer circumference of the screw 11. The cooler may be provided for cooling of rising temperature during transference and stirring of the thermoplastic polymer materials. Also, a rotatable molding block 14 may be disposed at the outlet side of the extruder 13 to form the thermoplastic polymer materials into a preform 15 of a desired hollow corrugated shape.

The corrugated extrusion process, that is, a preform formation process, performed by the corrugated extrusion part 10 may be sequentially performed in the order of a transferring/stirring process while the thermoplastic polymer materials are molten along the screw 11, and a process for forming the thermoplastic polymer materials into a preform with a hollow corrugated shape. More specifically, when the thermoplastic polymer materials are supplied to the extruder 13, the thermoplastic polymer materials may be elongated by a vacuum machine connected to the extruder 13, and may gather on the corrugated molding surface formed in the inner wall of the extruder 13, e.g., the wall surface of the extruder 13. Simultaneously, a preform 15 having a closed sectional corrugated shape may be formed by the rotation of the extruder 13. In this case, the thermoplastic resin for forming the preform 15 may include at least one of thermoplastic elastomer (TPE), polyethylene (PE), polypropylene (PP), polyvinylchloride (PVD), and polyethylene terephthalate (PET). Thus, after the preform 15 of a hollow corrugated shape is manufactured by continuous extrusion of the thermoplastic polymer materials at the corrugated extrusion part 10, the preform 15 may be transferred to the braiding part 20 to be applied to the next process.

Continuous fiber, e.g., a strength-reinforcing material, may be woven into a three-dimensional woven fabric on the preform 15 by the braiding part 20 and its braiding process without a separate heat treatment process. Through the braiding part 20 and its braiding process, the strength-reinforcing materials such as glass fiber, carbon fiber, aramid fiber, and graphite fiber may be woven into a three-dimensional shapes on the outer circumference of the preform 15 formed of thermoplastic polymer.

The braiding part 20 may include a table 21 having an aperture at the center thereof to pass the preform 15. Also, a plurality of carriers 22 unwindably wound with a strength-reinforcing yarn 23 such as glass fiber, carbon fiber, aramid fiber, and graphite fiber may be disposed around the aperture of the table 21.

In this case, the plurality of carriers 22 may rotate along the movement path (not shown) in a figure eight shape (∞-shape)

formed in the table 21. While the yarn 23 wound on the carrier 21 is being unwound along the movement path of ∞-shape of each carrier 21, a three-dimensional woven fabric 24 that is braided may be formed on the surface of the preform 15. Accordingly, the braided three-dimensional woven fabric 24 may be formed on the outer layer of the braided three-dimensional woven fabric 24 as an intermediate product 25 of the corrugated plastic composite spring.

Next, the intermediated product 25 of the corrugated plastic composite spring in which the three-dimensional woven fabric 24 is formed on the preform 15 formed of thermoplastic polymer materials through the braiding process by the braiding part 20 may be transferred to the pultrusion part 30. In the pultrusion part 30, the three-dimensional woven fabric 24 may be impregnated with thermosetting resin, and then may be hardened. The pultrusion part 30 may include a low-temperature impregnation tank 31 for impregnating the three-dimensional woven fabric 24 with thermosetting resin and a continuous process oven 32 for heating and cross-linking the thermosetting resin impregnated in the three-dimensional woven fabric 24 of the intermediate product 25 of the corrugated plastic composite spring.

The thermosetting resin may include at least one of epoxy resin, unsaturated polyester resin, and vinyl ester resin. Also, the pultrusion part 30 may include a cutter 33 for cutting products hardened by the continuous process oven 32 into an appropriate length.

In the low-temperature impregnation tank 31, the impregnation may be performed by spraying or showering resin on a specific location while rotating the intermediate product 25 of the corrugated plastic composite spring, in order to perform effective impregnation and reduce a loss of resin.

Accordingly, a corrugated plastic composite spring for a suspension according to an embodiment of the present invention may be manufactured by impregnating the three-dimensional woven fabric 24 with thermosetting resin in the low-temperature impregnation tank 31 of the pultrusion part 30, heating and cross-linking the thermosetting resin impregnated in the three-dimensional woven fabric 24 of the intermediate product 25 of the corrugated plastic composite spring, and cutting the hardened product into an appropriate length using the cutter 33.

A first puller 27 that can transfer products at a constant speed during processing may also be disposed at the end portion of the braiding part 20. Furthermore, a second puller 34 similar to the first puller 27 may be disposed between the continuous process oven 32 and the cutter 33 of the pultrusion part 30. The first and second pullers 27 and 34 may include a pair of rollers that rotate in the same direction as the transferring direction of the product and may be vertically disposed. The product may be transferred at a constant speed by the rotating force of the rollers.

Figure 2:
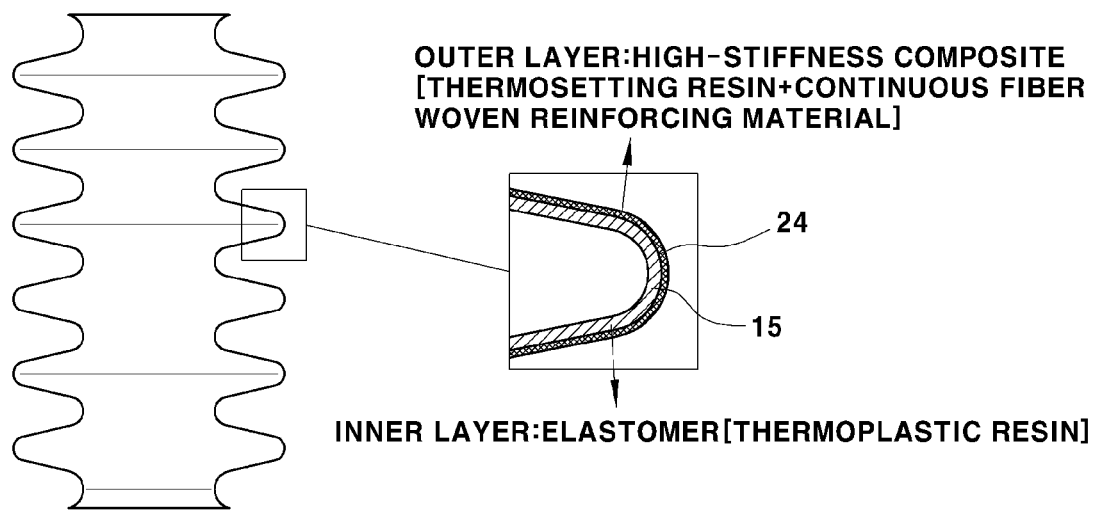
FIG. 2 is a diagram illustrating the structure of a corrugated plastic composite spring for a vehicle suspension according to an exemplary embodiment of the present invention.

As shown in FIG. 2, the corrugated plastic composite spring for the suspension may have an inner layer formed of the preform 15 using thermoplastic resin serving as an elastic body, and an outer layer formed of the three-dimensional woven fabric 24 on the preform 15, in which the three-dimensional woven fabric 24 is impregnated with thermosetting resin.

Hereinafter, an exemplary embodiment of the present invention will be described in detail so that persons skilled in the art can easily implement it.

Embodiment

The inner material (thermoplastic elastomer) of a corrugated plastic composite spring according to an embodiment of the present invention was formed of TPE-V type thermoplastic elastomer (Product name: Santoprene 101-87). The outer material thereof was formed using three-dimensional woven fabric having a triaxial (0°, ±45°) braiding woven pattern using glass fiber, and was manufactured by impregnating a three-dimensional woven fabric with epoxy resin in a low-temperature impregnation tank at a normal temperature (about 25° C.) and maintaining it in the continuous process oven for about 30 minutes at about 120~175° C.

Comparative Examples

As a comparative example 1, a typical steel coil-type spring was manufactured. As a comparative example 2, a coil-type spring was manufactured using thermosetting resin and glass fiber. As a comparative example 3, a coil-type spring was manufactured using thermosetting resin and carbon fiber. Finally, as a comparative example 4, a coil-type sprig was manufactured using thermosetting resin and glass/carbon fiber.

Test Example

The spring constants of the embodiment and the comparative examples 1 to 4 were measured. The measurement results are shown in Table 1 below.

TABLE 1

| | Spring Shape | | | | |
|---|---|---|---|---|---|
| | Coil-type [Comparative Example 1] | Coil-type [Comparative Example 2] | Coil-type [Comparative Example 3] | Coil-type [Comparative Example 4] | Corrugated-type [Embodiment] |
| Spring Material | Steel | Thermosetting Resin + Glass Fiber | Thermosetting Resin + Glass Fiber | Thermosetting Resin + Glass Fiber | Thermosetting Resin + Glass Fiber |
| Spring Constant [kgf/mm] | 1.42 | 0.32 | 0.49 | 0.27 | 1.76 |

As shown in Table 1, the spring constant of the corrugated plastic composite spring according to the embodiment of the present invention was measured to be about 1.76 kgf/mm. Although the spring constant of the steel coil spring according to the comparative example 1 among the comparative examples 1 to 4 was measured to be the highest spring constant (e.g., about 1.42 kgf/mm), it was lower than the spring constant of the embodiment of the present invention. Thus, since the inner layer of the corrugated composite according to the embodiment of the present invention is formed of elastic thermoplastic resin having excellent isolation and damping performances, and the outer layer thereof is formed of a three-dimensional woven fabric impregnated with thermosetting resin as a high-stiffness composite, the inner layer can show isolation and damping characteristics against vibration and noise.

Figure 3:
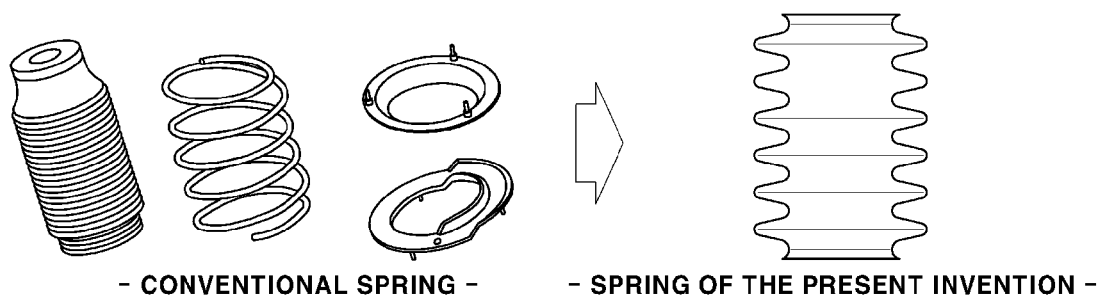
FIG. 3 is a diagram illustrating a comparison between a typical coil spring and a corrugated plastic composite spring for a vehicle suspension according to an exemplary embodiment of the present invention.

As shown in FIG. 3, since the corrugated plastic composite spring according to the embodiment of the present invention does not use components such as dust cover and upper and lower spring pads unlike a typical metal coil spring, there is a cost reduction associated with the required components in the illustrative embodiment of the present invention. Additionally, the overall process of manufacturing the springs is simplified.

According to embodiments of the present invention, NVH characteristics can be easily secured by manufacturing a corrugated plastic composite spring for a suspension system using different materials than are conventionally used, and continuous formation can be performed by linking three-step processes, thereby enabling improvement in productivity as well. Also, a suspension module can be simplified by omitting components such as a dust cover and upper and lower spring pads of a typical metal coil-type spring, and the fabrication process and cost for components can be reduced as well. In addition, the reduction in vehicle weight can be achieved.

Particularly, since an inner layer and an outer layer are formed of three-dimensional woven fabric impregnated with elastic thermoplastic resin and thermosetting resin, respectively, improved isolation can be achieved against vibration and noise.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for manufacturing a corrugated plastic composite spring for a vehicle suspension, the apparatus comprising:
    a corrugated extrusion part configured to form a preform having a hollow corrugated structure;
    a braiding part configured to weave a three-dimensional woven fabric on the preform; and
    a pultrusion part configured to impregnate the three-dimensional woven fabric with thermosetting resin.

2. The apparatus of claim 1, wherein the corrugated extrusion part comprises:
    a screw configured to transfer and stir a thermoplastic polymer material; and
    an extruder comprising a rotatable molding block configured to form the thermoplastic polymer material into a corrugated preform structure.

3. The apparatus of claim 1, wherein the braiding part comprises:
    a table having an aperture at the center thereof to pass the preform; and
    a plurality of carriers disposed around the aperture of the table and unwindably wound with a strength-reinforcing yarn.

4. The apparatus of claim 1, wherein the pultrusion part comprises:
    a low-temperature impregnation tank configured to impregnate the three-dimensional woven fabric with the thermosetting resin; and
    a continuous process oven configured to heat and cross-link the thermosetting resin impregnated in the three-dimensional woven fabric.

5. The apparatus of claim 4, wherein the pultrusion part further comprises a cutter configured to cut a product hardened by the continuous process oven into an appropriate length.

6. The apparatus of claim 1, further comprising a first and a second puller disposed at an end portion of the braiding part and between the continuous process oven and the cutter of the pultrusion part to transfer a product at a constant speed, respectively.

7. A method for manufacturing a corrugated plastic composite spring for a vehicle suspension, the method comprising:
    forming, by a corrugated extrusion part, a thermoplastic polymer material into a preform having a corrugated structure using a rotatable molding block of an extruder;
    forming, a braiding part, a three-dimensional woven fabric on an outer circumferential surface of the preform using a plurality of yarns; and
    impregnating, a pultrusion part, the three-dimensional woven fabric with thermosetting resin; and
    subsequent to impregnating, hardening the three-dimensional woven fabric.

8. The method of claim 7, wherein the thermoplastic polymer material comprises at least one of thermoplastic elastomer (TPE), polyethylene (PE), polypropylene (PP), polyvinylchloride (PVD), and polyethylene terephthalate (PET), and
    the thermosetting resin comprises at least one of epoxy resin, unsaturated polyester resin, and vinyl ester resin.

9. The method of claim 7, wherein the yarn of the three-dimensional woven fabric is selected from glass fiber, carbon fiber, aramid fiber, and graphite fiber.

10. The method of claim 7, further comprising cutting, by a cutter, a product into an appropriate length after the hardening of the three-dimensional woven fabric.

11. A corrugated plastic composite spring for a vehicle suspension, having a dual sectional structure of an inner layer and an outer layer and manufactured into a hollow corrugated shape obtained by an apparatus of claim 1,
    wherein the inner layer is formed of a preform using thermoplastic resin, and the outer layer is manufactured by forming a three-dimensional woven fabric on an outer circumferential surface of the preform and simultaneous) impregnating the three-dimensional woven fabric with thermosetting resin.

12. A corrugated plastic composite spring for a vehicle suspension, having a dual sectional structure of an inner layer and an outer layer and manufactured into a hollow corrugated shape,
    wherein the inner layer is formed of a preform using thermoplastic resin, and the outer layer is manufactured by forming a three-dimensional woven fabric on an outer circumferential surface of the preform and simultaneously impregnating the three-dimensional woven fabric with thermosetting resin.

* * * * *